US012620913B2

(12) United States Patent
Choudhury et al.

(10) Patent No.:     US 12,620,913 B2
(45) Date of Patent:          May 5, 2026

(54) POWER CONVERSION DEVICE INCLUDING A PLURALITY OF CONVERTER UNITS AND A BIDIRECTIONAL DC/DC CONVERTER CONNECTED BETWEEN TWO DC OUTPUTS OF A PLURALITY OF DC OUTPUTS OF THE PLURALITY OF CONVERTER UNITS

(71) Applicant: Hitachi, Ltd., Tokyo (JP)

(72) Inventors: Abhijit Choudhury, Tokyo (JP); Takae Shimada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 153 days.

(21) Appl. No.: 18/379,388

(22) Filed: Oct. 12, 2023

(65)          Prior Publication Data

US 2024/0154542 A1     May 9, 2024

(30)          Foreign Application Priority Data

Nov. 9, 2022     (JP) ................................. 2022-179453

(51) Int. Cl.
*H02M 7/538*          (2007.01)
*H02J 7/06*          (2006.01)
*H02M 3/335*          (2006.01)
*H02M 7/5387*          (2007.01)
(52) U.S. Cl.
CPC ............. *H02M 7/5387* (2013.01); *H02J 7/06* (2013.01); *H02M 3/33584* (2013.01); *H02J 2207/20* (2020.01)
(58) Field of Classification Search
CPC .... H02M 7/5387; H02M 3/33584; H02J 7/06; H02J 2207/20

USPC .......................................................... 363/13
See application file for complete search history.

(56)          References Cited

U.S. PATENT DOCUMENTS

| | | | | |
|---|---|---|---|---|
| 6,795,322 | B2 * | 9/2004 | Aihara | ..................... H02J 9/061 |
| | | | | 307/64 |
| 2017/0282728 | A1 * | 10/2017 | Jeon | ......................... B60K 6/28 |
| 2018/0159325 | A1 * | 6/2018 | Klesyk | ...................... H02J 3/00 |
| 2020/0006970 | A1 * | 1/2020 | Chen | ..................... H02M 7/217 |

(Continued)

FOREIGN PATENT DOCUMENTS

| | | |
|---|---|---|
| CN | 111952118 W | 11/2020 |
| EP | 3 890 135 A1 | 10/2021 |

(Continued)

OTHER PUBLICATIONS

Extended European Search Report received in corresponding European Application No. 23201283.1 dated Apr. 4, 2024.

(Continued)

*Primary Examiner* — Yemane Mehari
(74) *Attorney, Agent, or Firm* — MATTINGLY & MALUR, PC

(57)          ABSTRACT

A power conversion device charges a plurality of storage devices and includes a plurality of converter units that receives AC power and outputs DC power, and a bidirectional DC/DC converter connected between two DC outputs of a plurality of DC outputs of the plurality of converter units. The bidirectional DC/DC converter transmits at least a part of output power of the converter unit at one DC output from the one DC output to the other DC output of the two DC outputs according to required power of the plurality of storage devices.

12 Claims, 13 Drawing Sheets

(56)　　　　　References Cited

U.S. PATENT DOCUMENTS

| | | | |
|---|---|---|---|
| 2021/0336440 A1 | 10/2021 | Canales et al. | |
| 2023/0178982 A1 | 6/2023 | Ortiz et al. | |
| 2024/0039414 A1 * | 2/2024 | Kikuchi | B60L 53/67 |
| 2024/0266969 A1 * | 8/2024 | Kamizuma | H02M 1/0009 |

FOREIGN PATENT DOCUMENTS

| | | | | |
|---|---|---|---|---|
| EP | 3566283 B1 * | 3/2023 | | H02J 3/322 |
| JP | 2012-70479 A | 4/2012 | | |
| JP | 2019-129690 A | 8/2019 | | |
| JP | 2022-127230 A | 8/2022 | | |
| WO | 2019/234988 A1 | 12/2019 | | |
| WO | 2020/141047 A1 | 7/2020 | | |
| WO | 2021/198270 A1 | 10/2021 | | |
| WO | 2022/044431 A1 | 3/2022 | | |

OTHER PUBLICATIONS

Japanese Office Action received in corresponding Japanese Application No. 2022-179453 dated Feb. 17, 2026.

* cited by examiner

POWER CONVERSION DEVICE INCLUDING A PLURALITY OF CONVERTER UNITS AND A BIDIRECTIONAL DC/DC CONVERTER CONNECTED BETWEEN TWO DC OUTPUTS OF A PLURALITY OF DC OUTPUTS OF THE PLURALITY OF CONVERTER UNITS

CLAIM OF PRIORITY

The present application claims priority from Japanese application serial no. 2022-179453, filed on Nov. 9, 2022, the content of which is hereby incorporated by reference into this application.

BACKGROUND OF THE INVENTION

1. Field of the Invention

The present invention relates to a power conversion device including a plurality of outputs.

2. Description of the Related Art

With the spread of renewable energy sources in a power system and progress of development of charging facilities for electric vehicles, a middle-to-high voltage isolated AC/DC converter is becoming commonly used as a power conversion device for interconnecting a high-voltage AC power supply and a low-voltage DC bus.

In a case where outputting DC power to a plurality of loads (for example, electric vehicles), the isolated AC/DC converter includes a plurality of converter cells each including an isolated AC/DC converter circuit. As a conventional technique related to such an isolated AC/DC converter, a technique described in WO 2019/234988 is known.

In the technique described in WO 2019/234988 A, AC inputs of the plurality of converter cells each including the isolated AC/DC converter circuit are connected in series to each other. The AC input connected in series is directly connected to a high-voltage AC power supply system without passing through a transformer.

Each converter cell includes an AC/DC conversion circuit having an AC input, a smoothing capacitor connected to a DC side of the AC/DC conversion circuit, a DC/AC conversion circuit having an AC side connected to a DC side of the AC/DC conversion circuit, a radio frequency transformer having a primary winding connected to an AC side of the DC/AC conversion circuit, and an AC/DC conversion circuit having a DC side connected to a secondary winding of the radio frequency transformer and having an AC output.

DC outputs of the plurality of converter cells are connected to a plurality of input ports of a switch, respectively. In the switch, open/close units are connected in a matrix form between the plurality of input ports and a plurality of output ports. Therefore, by operating the open/close unit, the DC output of each converter cell is connected to any output port. In addition, any number of input ports are connected to the output port to which the load is connected according to the power required by the load. Each converter cell supplies DC power to a storage battery of the electric vehicle as the load connected to the output port to charge the storage battery.

SUMMARY OF THE INVENTION

In the above-described conventional technique, there is a problem that an installation space of a switch to which the open/close units are connected in a matrix is required, and a power loss increases due to operating power of the switch.

Therefore, the present invention provides a power conversion device capable of charging a plurality of storage devices according to required power without using a switch, and a method of controlling the power conversion device.

In order to solve the above problems, a power conversion device according to the present invention charges a plurality of storage devices, the power conversion device including a plurality of converter units that receives AC power and outputs DC power, and a bidirectional DC/DC converter connected between two DC outputs of a plurality of DC outputs of the plurality of converter units. The bidirectional DC/DC converter transmits at least a part of output power of the converter unit at one DC output from the one DC output to the other DC output of the two DC outputs according to required power of the plurality of storage devices.

In order to solve the above problems, a method of controlling a power conversion device according to the present invention is a method of controlling a power conversion device that charges a plurality of storage devices, the power conversion device including a plurality of converter units that receives AC power and outputs DC power; and a bidirectional DC/DC converter connected between two DC outputs of a plurality of DC outputs of the plurality of converter units. The method calculates an average value of required power of the plurality of storage devices, controls output power of the plurality of storage devices based on the average value, and controls output power of the bidirectional DC/DC converter based on the required power and the average value.

According to the present invention, by providing a bidirectional DC/DC converter, a plurality of storage devices can be charged according to required power.

Problems, configurations, and effects other than those described above will be clarified by the following description of embodiments.

BRIEF DESCRIPTION OF THE DRAWINGS

FIG. 6 is a circuit diagram illustrating an example of a DC/DC conversion circuit 112 (FIG. 1);

FIG. 7 is a circuit diagram illustrating another example of the DC/DC conversion circuit 112 (FIG. 1);

FIG. 11 is a schematic functional block diagram illustrating a flow of power in a third operation mode of the power conversion device 127;

DESCRIPTION OF THE PREFERRED EMBODIMENTS

Figure 1:
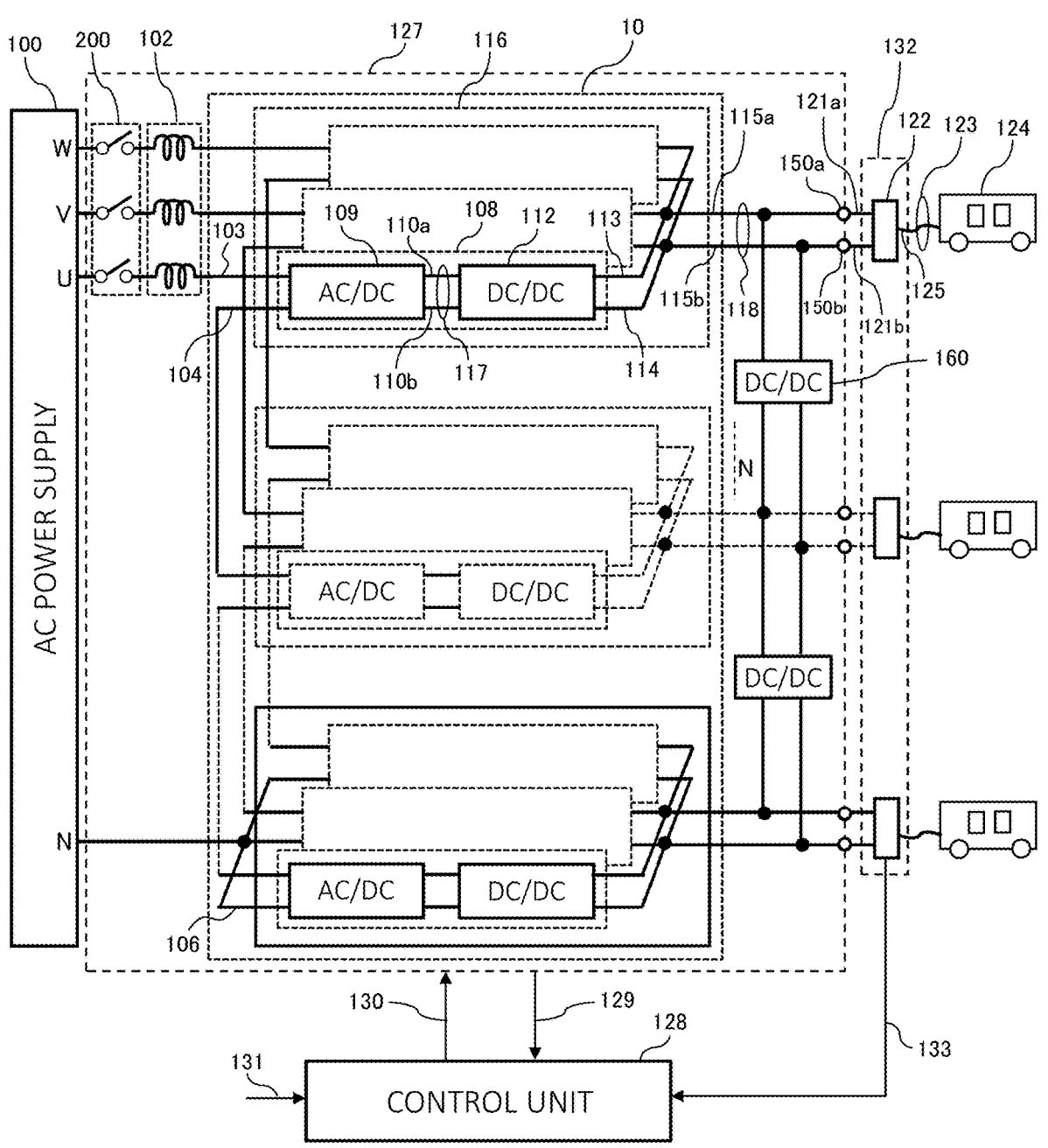
FIG. 1 is a functional block diagram illustrating a configuration of a power conversion device for charging an electric vehicle according to an embodiment.

Hereinafter, embodiments of the present invention will be described with reference to the drawings. In the drawings, the same reference numerals indicate the same components or components having similar functions.

FIG. 1 is a functional block diagram illustrating a configuration of a power conversion device for charging an electric vehicle according to an embodiment of the present invention. In the following description, the term "electric vehicle" is referred to as an "EV".

The power conversion device 127 includes a power conversion unit 10 that receives three-phase AC power from a three-phase four-wire AC power supply 100 via a power switch 200 and a three-phase reactor 102 connected in series to each other, and a bidirectional DC/DC converter 160 connected to an output side of the power conversion unit 10.

The power conversion unit 10 includes a plurality (N) of converter units 116. "N" is an integer of 2 or more. Each converter unit 116 includes converter cells 108 for three phases (that is, three cells) each receiving single-phase AC power from one phase of the AC power supply 100. Each converter cell 108 includes an AC/DC conversion circuit 109 that converts the single-phase AC power into DC power, and a DC/DC conversion circuit 112 that converts the DC power output from the AC/DC conversion circuit 109 into DC power having a different voltage. DC output terminals of the AC/DC conversion circuit 109 and DC input terminals of the DC/DC conversion circuit 112 are connected to each other by DC buses 110a and 110b.

In the plurality (N) of converter units 116, AC inputs each for one phase of the converter cells 108 for three phases (three cells) included in each converter unit 116 are connected in series to each other. That is, each of the AC inputs 103 and 104 of the plurality (N) of AC/DC conversion circuits 109 are connected in series to each other. One end (103) and the other end 106 of the series connection of the AC input are connected to one phase (for example, U phase) of the AC power supply 100 and a neutral point N of the AC power supply 100, respectively. As a result, the input of the converter cell 108 can be directly connected to the AC power supply 100 of a high-voltage (for example, 6.6 kV or 11 kV) without passing through a transformer.

DC outputs of the converter cells 108 for three phases (three cells) included in each converter unit 116 are connected in parallel to each other. That is, the DC outputs 113 and 114 of the DC/DC conversion circuits 112 for three phases (three circuits) are connected in parallel to each other. Thus, the DC output of each converter unit 116 is configured.

Each DC output of the plurality (N) of converter units 116 is connected to one set of a plurality (N sets: one set of two (positive and negative)) of DC output terminals 150a and 150b via DC buses 115a and 115b. Each of the plurality (N) of DC output terminals 150a and 150b is electrically connected to one of a plurality (N) of EV charging ports 122 via connection cables 121a and 121b, respectively. EV 124 is connected to each of the plurality (N) of EV charging ports 122 (charging stations) via a charging cable 125.

Here, when the plurality (N) of converter units 116 include first to N-th converter units, in the present embodiment, the bidirectional DC/DC converter 160 is connected between the DC output of the (N−1)-th converter unit and the DC output of the N-th converter unit. Thus, as will be described later, DC power can be transmitted between different DC outputs.

A control unit 128 generates a control command signal 130 for each converter cell 108 and each bidirectional DC/DC converter 160 for DC output power control of each converter cell 108 and transmission power control of each bidirectional DC/DC converter 160 based on voltage and current information 129, voltage or current reference value 131, and EV side information 133 from the plurality (N) of EV charging ports 122, that is, an EV charging port group 132 in the power conversion device 127.

In the present embodiment, the voltage and current information 129 is DC bus voltage/current 117 in the DC buses 110a and 110b that connect the AC/DC conversion circuit 109 and the DC/DC conversion circuit 112 to each other in each converter cell 108, and DC bus voltage/current 118 in the DC buses 115a and 115b to which the DC output of each converter unit 116 is connected. The voltage and current information 129 is detected by a voltage sensor and a current sensor, respectively.

In the present embodiment, the EV side information 133 includes SOC information 123 related to a state of charge (SOC) of a storage device (for example, a storage battery) of the EV, user setting information such as a charging speed (low speed, medium speed, high speed, and ultra high speed), and EV connection information related to connection/non-connection of the EV to the EV charging port 122. The SOC information 123 is transmitted to the control unit 128 via a communication line included in the charging cable 125 and the EV charging port 122. The user setting information is set by a switch operation or a button operation of the EV charging port 122. The EV connection information is detected by the EV charging port 122. The user setting information and the EV connection information are transmitted to the control unit 128 by the EV charging port 122.

Figure 2:
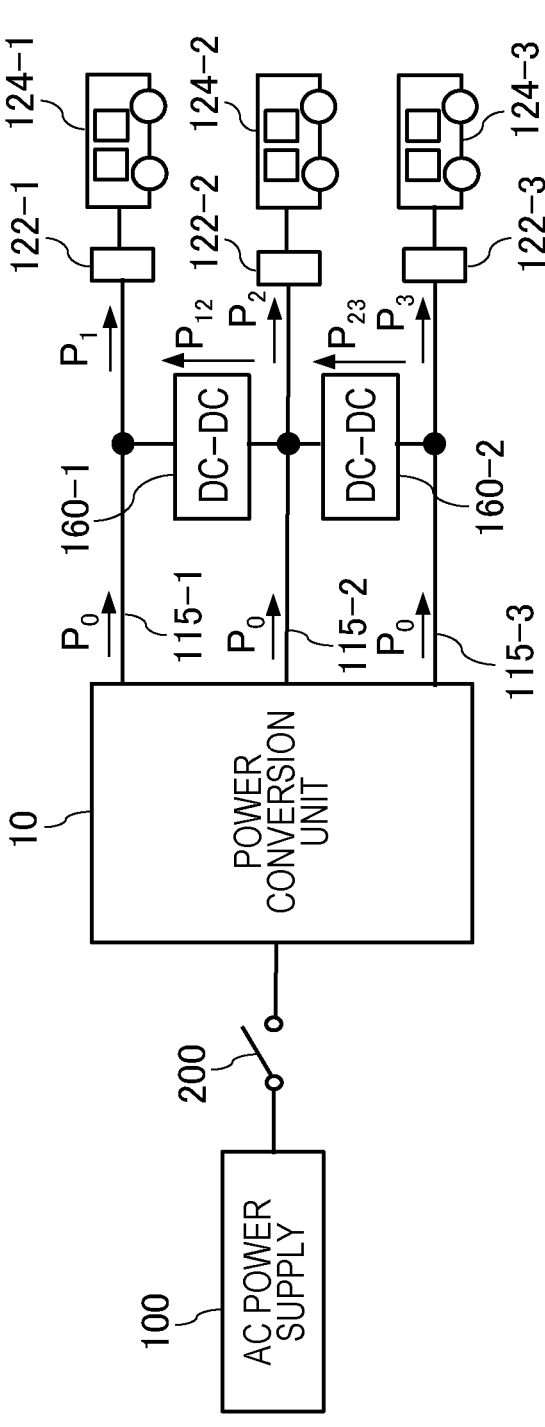
FIG. 2 is a schematic functional block diagram illustrating a flow of power in the power conversion device of the present embodiment.

FIG. 2 is a schematic functional block diagram illustrating a flow of power in the power conversion device of the present embodiment. In FIG. 2, the number of outputs of the power conversion unit 10 is "3". That is, the above-described "N" is "3".

In FIG. 2, the required power in EV 124-1, EV 124-2, and EV 124-3 is $P_1$, $P_2$, and $P_3$, respectively. Equal DC output power $P_0$ is output from each of DC outputs 115-1, 115-2 and 115-3 of the power conversion unit 10.

The DC outputs 115-1, 115-2, and 115-3 are connected to EV charging ports 122-1, 122-2, and 122-3, respectively. DC power output from the power conversion unit 10 is charged in the EV 124-1, 124-2, and 124-3 via respective charging ports.

Total required power ($P_1+P_2+P_3$) of three EVs is covered by total DC output power ($3P_0$) from the power conversion unit 10. Therefore, in the present embodiment, $P_0$ is set to the average value (($P_1+P_2+P_3$)/3) of the required power.

In a case where any one of $P_1$, $P_2$, and $P_3$ is larger than $P_0$, at least a part of the output power from the power conversion unit 10 is transmitted between the DC outputs by any one of bidirectional DC/DC converters 160-1 and 160-2 so as to compensate for the shortage of $P_0$ to satisfy the required power.

For example, in a case where $P_1 > P_0$ and $P_1 > P_2 > P_3$, DC power $P_{12}$ ($=P_1 - P_0$) is transmitted to the DC output 115-1 by the bidirectional DC/DC converter 160-1 so as to satisfy the required power $P_1$. In addition, DC power $P_{23}$ ($=P_2 - P_0 + P_{11}$: $P_3 = P_0 - P_{23}$) is transmitted to the DC output 115-2 by the bidirectional DC/DC converter 160-2 so as to satisfy $P_2$ and $P_3$.

As described above, $P_0$, $P_{12}$, and $P_{23}$ are set based on the required power $P_1$, $P_2$, and $P_3$.

Power can be transmitted between the DC outputs 115-1 and 115-3 sequentially via the bidirectional DC/DC converters 160-1 and 160-2 according to the required power $P_1$, $P_2$, and $P_3$. Similarly, when the number of DC outputs N is 3 or more, the power can be transmitted between the DC outputs 115-$m$ and 115-$n$ ($m$ and $n$ are natural numbers: $m$, $n \leq N$, $m \neq n$) sequentially via a plurality of the bidirectional DC/DC converters of N−1 bidirectional DC/DC converters.

In addition, the power can be transmitted to the DC outputs 115-2 from the DC outputs 115-1 and 115-3 via the bidirectional DC/DC converters 160-1 and 160-2, respectively, according to $P_1$, $P_2$, and $P_3$. Similarly, when the number of DC outputs N is 3 or more, the power can be transmitted to the DC output 115-$n$ ($n$ is a natural number: $2 \leq n \leq N-1$) from the DC outputs 115-($n-1$) and 115-($n+1$) via the bidirectional DC/DC converters 160-($n-1$) and 160-$n$, respectively.

A difference in the required power in the EV as described above corresponds to a difference in charging speed. Therefore, a plurality of EVs having different charging speeds can be simultaneously charged by the bidirectional DC/DC converters connected between the DC outputs of the power conversion device 127.

In a case where the settable charging speed has a plurality of stages including a normal charging speed and a charging speed faster than the normal charging speed, the rated power capacity of the bidirectional DC/DC converter is preferably an amount of power of the EV storage device during the normal charging, that is, 50% or more of the rated power capacity of the converter unit 116, and smaller than the rated power capacity of the converter unit 116.

Figure 3:
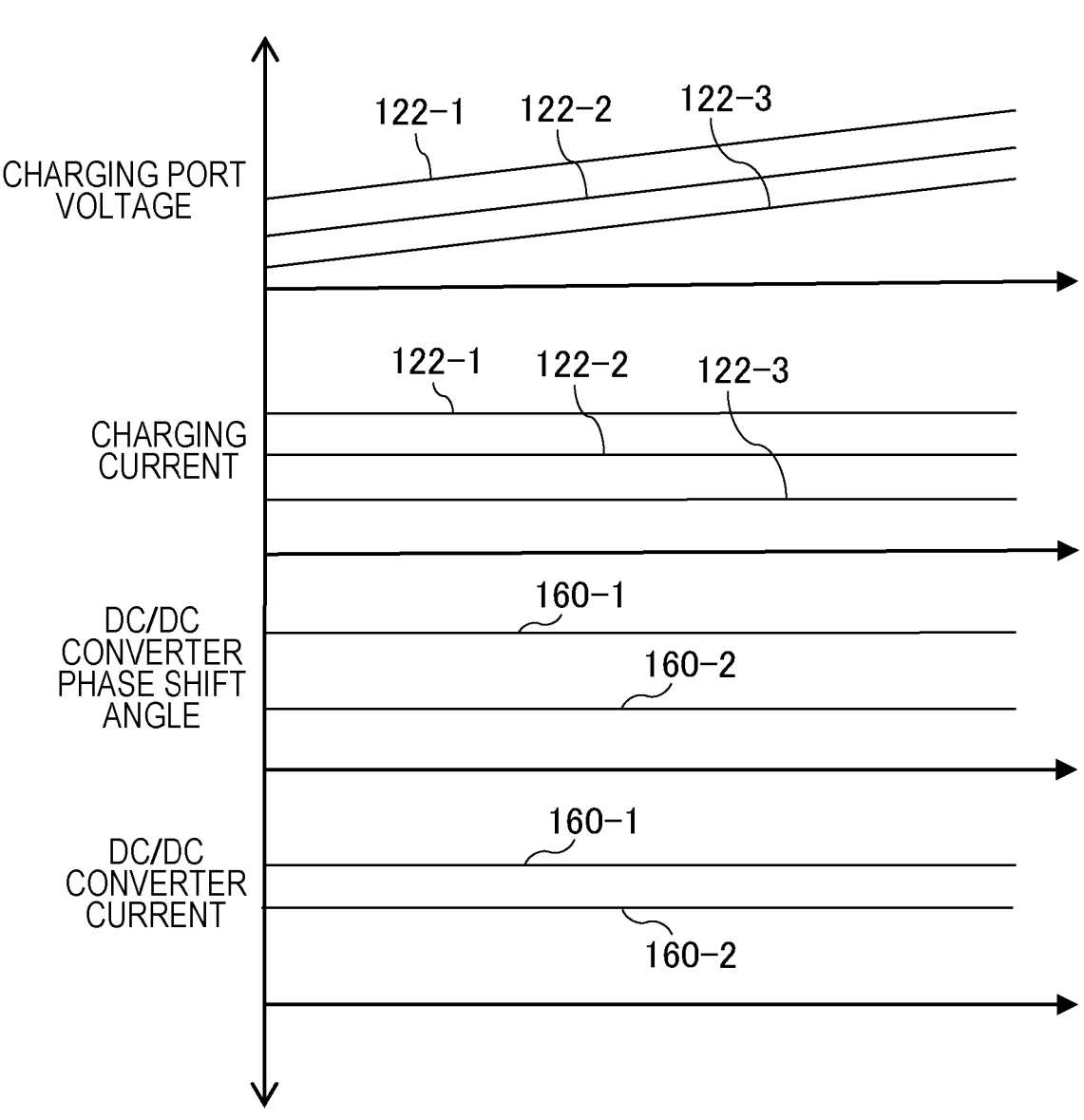
FIG. 3 is a waveform diagram illustrating an example of an operation state at the time of charging of a power conversion device 127 according to the embodiment.

FIG. 3 is a waveform diagram illustrating an example of an operation state at the time of charging of the power conversion device 127 according to the present embodiment illustrated in FIG. 2.

In FIG. 3, from the top, voltages in the EV charging ports (122-1, 122-2, and 122-3), EV charging currents each detected in a respective one of the charging ports, phase shift angles of the DC/DC converters (112 (FIG. 1), 160-1, and 160-2), and output currents of the DC/DC converters (112 (FIG. 1), 160-1, and 160-2) are illustrated.

In the present embodiment, in the DC/DC converter (112 (FIG. 1), 160-1, and 160-2), the output power or the output current is controlled by phase shift control.

The voltages at the EV charging ports 122-1, 122-2, and 122-3 are the voltages of the storage devices in the EVs 124-1, 124-2, and 124-3, respectively, and each indicates charge state of a respective one of the storage devices.

The EV charging currents are larger at the EV charging ports 122-1, 122-2, and 122-3, in that order. That is, the EV charging currents are larger in the order of the EVs 124-1, 124-2, and 124-3, corresponding to descending order of the required power $P_1$, $P_2$, and $P_3$ ($P_1 > P_2 > P_3$) in the EVs 124-1, 124-2, and 124-3.

The phase shift angle in each DC/DC converter (112 (FIG. 1)) in the power conversion device 127 is set according to the average value ($P_0$ (FIG. 2)$=(P_1 + P_2 + P_3)/3$) of the required power ($P_1$, $P_2$, and $P_3$). The phase shift angle in the bidirectional DC/DC converter 160-1 is set according to the DC power $P_{12}$ ($=P_1 - P_0$) transmitted from the DC output 115-2 to the DC output 115-1 so as to satisfy the required power $P_1$. The phase shift angle in the bidirectional DC/DC converter 160-2 is set according to the DC power $P_{23}$ ($=P_2 - P_0 + P_{11}$:$P_3 = P_0 - P_{23}$) transmitted from the DC output 115-3 to the DC output 115-2 so as to satisfy $P_2$ and $P_3$.

As described above, $P_0$, $P_{12}$, and $P_{23}$ are set based on the required power $P_1$, $P_2$, and $P_3$. Therefore, each phase shift angle can be set based on the required power $P_1$, $P_2$, and $P_3$.

In each of the bidirectional DC/DC converters 160-1 and 160-2, a current flows according to a respective one of transmission power ($P_{12}$ and $P_{23}$), that is, the phase shift angles. As illustrated in FIG. 3, the bidirectional DC/DC converter 160-1 has a larger phase shift angle than the bidirectional DC/DC converter 160-2, and accordingly, a larger current flows than the bidirectional DC/DC converter 160-2.

Figure 4:
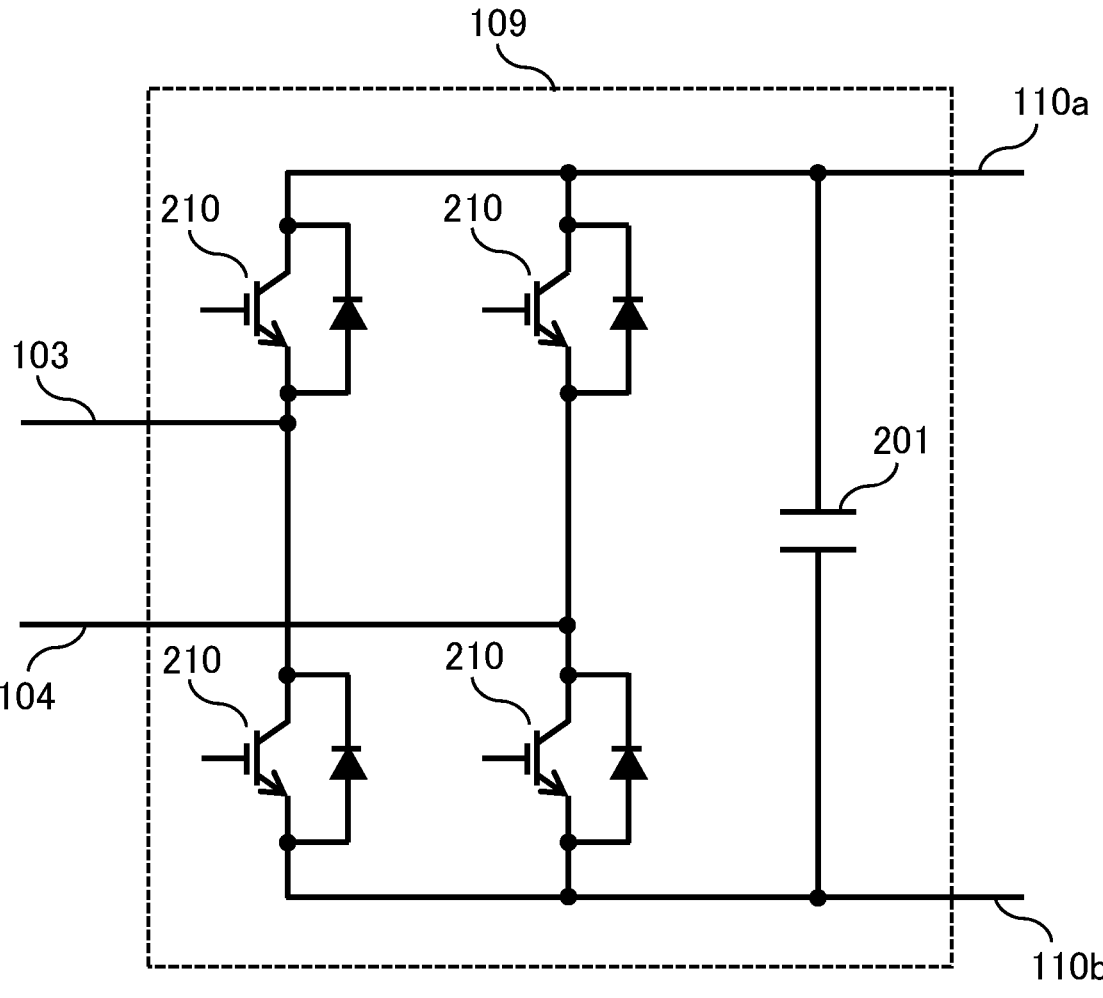
FIG. 4 is a circuit diagram illustrating an example of an AC/DC conversion circuit 109 (FIG. 1)

FIG. 4 is a circuit diagram illustrating an example of the AC/DC conversion circuit 109 (FIG. 1).

As illustrated in FIG. 4, the AC/DC conversion circuit 109 includes a single-phase full-bridge circuit using a semiconductor device 210 in which a semiconductor switching element (In FIG. 4, an IGBT) and a diode are connected in anti-parallel to each other. Series connection points of two semiconductor devices 210 in each of half bridge circuits are defined as AC inputs 103 and 104, respectively. A capacitor 201 is connected in parallel to two half-bridge circuits connected in parallel to each other. Parallel connection points between the two half bridges and the capacitor 201 are connected to the DC buses 110$a$ and 110$b$, respectively, as DC outputs.

AC power input to the AC inputs 103 and 104 is rectified by the diode and converted to DC power. The DC power is charged in the capacitor 201 and is output to the DC buses 110$a$ and 110$b$.

The AC/DC conversion circuit 109 converts the DC power input to the DC buses 110$a$ and 110$b$ into AC power by the semiconductor switching element, and outputs the AC power from the AC inputs 103 and 104. That is, the AC/DC conversion circuit 109 operates as a bidirectional power conversion circuit.

Figure 5:
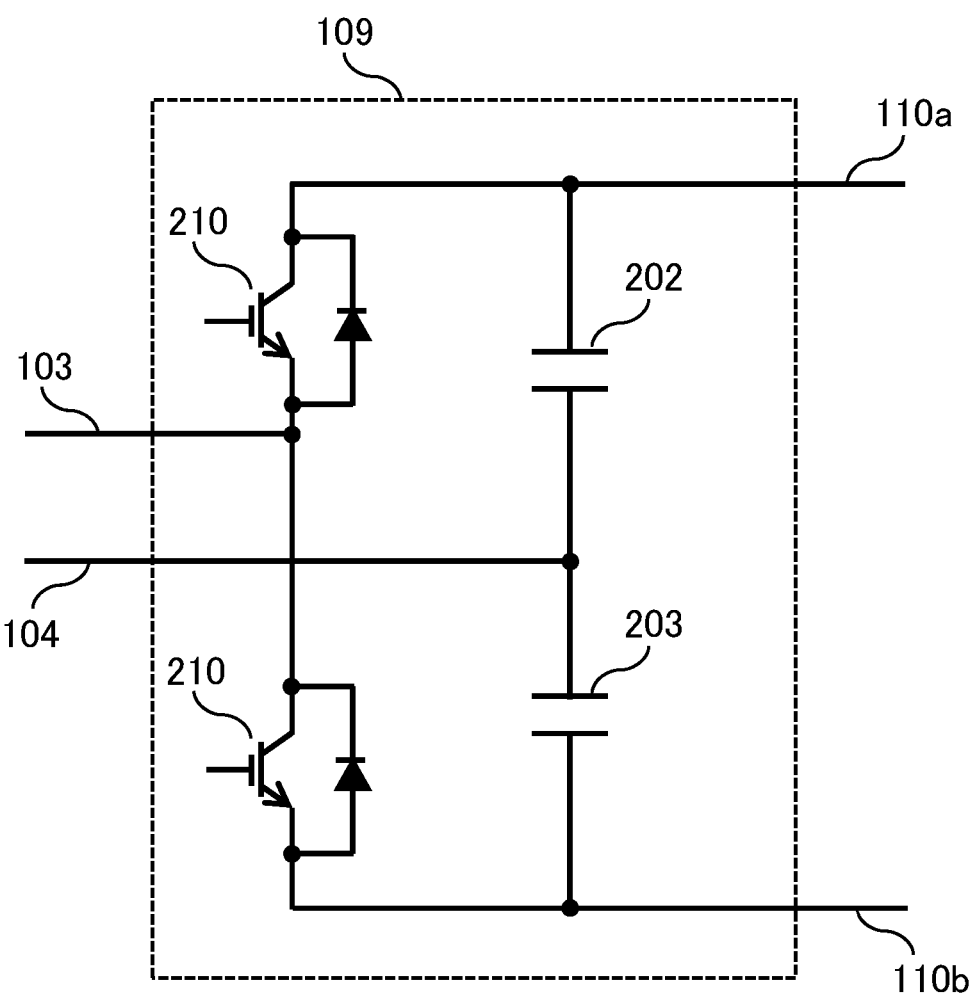
FIG. 5 is a circuit diagram illustrating another example of the AC/DC conversion circuit 109 (FIG. 1)

FIG. 5 is a circuit diagram illustrating another example of the AC/DC conversion circuit 109 (FIG. 1).

As illustrated in FIG. 5, the AC/DC conversion circuit 109 includes a parallel connection between one half bridge circuit using the semiconductor device 210 in which the semiconductor switching element (In FIG. 5, the IGBT) and the diode are connected in antiparallel to each other, and a series connection circuit of capacitors 202 and 203. A series connection point of the two semiconductor devices 210 in the half bridge circuit and a series connection point of the capacitors 202 and 203 are referred to as AC inputs 103 and 104, respectively. Parallel connection points between the half bridge circuit and the series connection circuit of the capacitors 202 and 203 are connected to the DC buses 110$a$ and 110$b$, respectively, as the DC outputs.

The AC power input to the AC inputs 103 and 104 is rectified by the diode and converted to the DC power. The DC power is alternately charged in the capacitors 202 and 203 according to the polarity of the AC input voltage.

The AC/DC conversion circuit 109 illustrated in FIG. 5 converts the DC power input to the DC buses 110$a$ and 110$b$ into AC power by the semiconductor switching element, and outputs the AC power from the AC inputs 103 and 104. That is, the AC/DC conversion circuit 109 operates as the bidirectional power conversion circuit.

Figure 6:
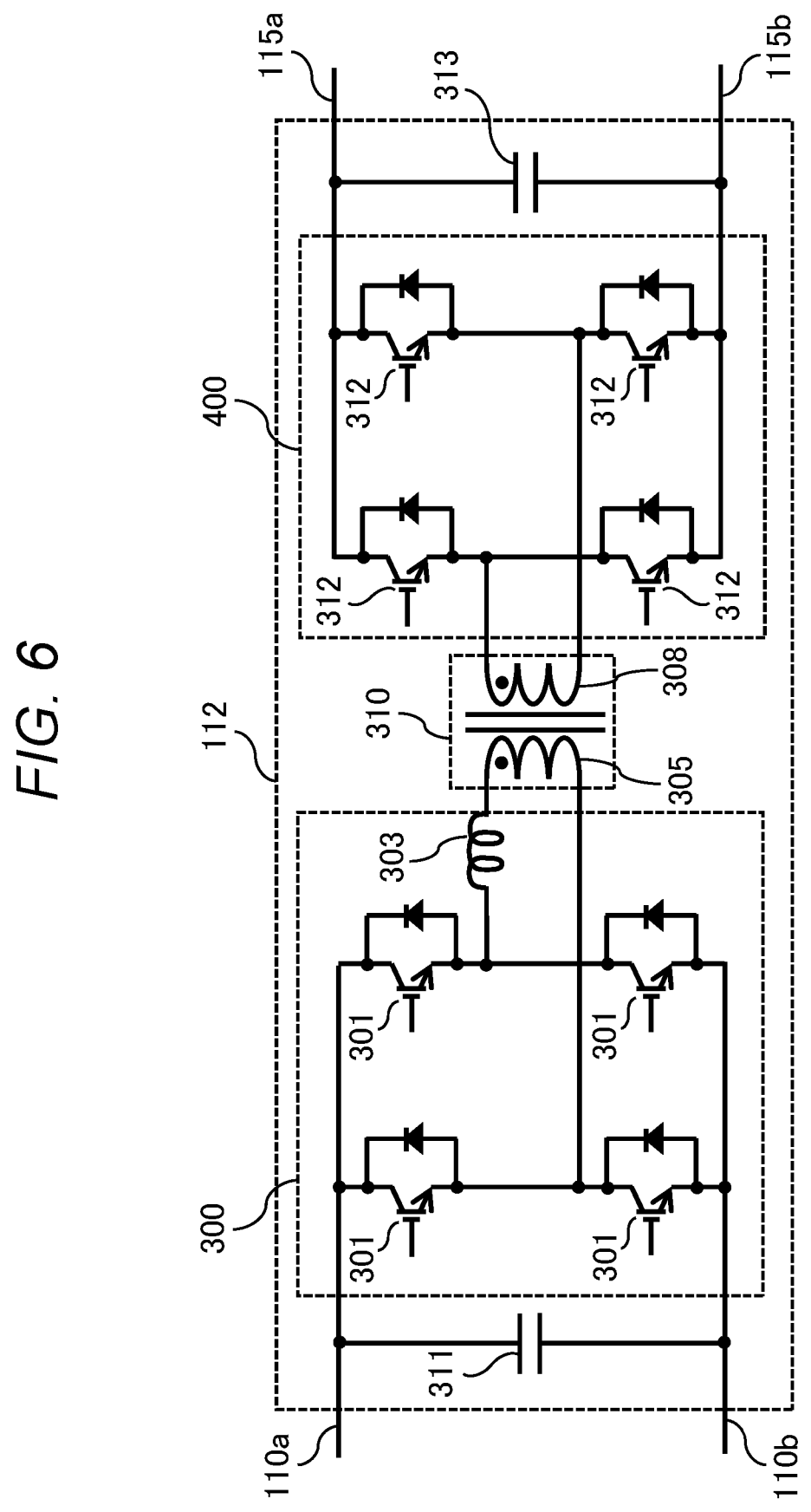

FIG. 6 is a circuit diagram illustrating an example of the DC/DC conversion circuit 112 (FIG. 1).

As illustrated in FIG. 6, the DC/DC conversion circuit 112 is of an isolated type, and includes a DC/AC conversion circuit 300 and an AC/DC conversion circuit 400 connected to the DC/AC conversion circuit 300 via a radio frequency transformer 310.

The DC/AC conversion circuit 300 includes a single-phase full-bridge circuit using a semiconductor device 301 in which a semiconductor switching element (In FIG. 6, the IGBT) and a diode are connected in antiparallel to each other.

A capacitor 311 is connected in parallel to two half-bridge circuits connected in parallel to each other. Parallel connection points between the two half bridges and the capacitor 311 are connected to the DC buses 110a and 110b, respectively, as DC inputs. A series connection point of two semiconductor devices 301 in the half bridge circuits is connected as an AC output to a primary winding 305 of the radio frequency transformer 310 via a reactor 303.

The AC/DC conversion circuit 400 includes a single-phase full-bridge circuit using a semiconductor device 312 in which a semiconductor switching element (In FIG. 6, the IGBT) and a diode are connected in antiparallel to each other.

A series connection point of two semiconductor devices 312 in the half bridge circuits is connected to a secondary winding 308 of the radio frequency transformer 310 as an AC input. The capacitor 313 is connected in parallel to two half-bridge circuits connected in parallel to each other. Parallel connection points between the two half bridges and the capacitor 313 are connected to the DC buses 115a and 115b, respectively, as DC outputs.

The DC/AC conversion circuit 300 converts DC power input from the DC buses 110a and 110b via the capacitor 311 into AC power by the semiconductor switching element, and outputs the AC power to the primary winding 305 of the radio frequency transformer 310. The radio frequency transformer 310 steps down or steps up the AC voltage of the AC power received by the primary winding 305, and outputs the AC power to the secondary winding 308.

The AC/DC conversion circuit 400 rectifies the AC power input from the secondary winding 308 by the diode and converts the rectified AC power into DC power. The DC power is charged in the capacitor 313 and is output to the DC buses 115a and 115b.

The AC/DC conversion circuit 400 converts DC power input from the DC buses 115a and 115b into AC power by the semiconductor switching element. The DC/AC conversion circuit 300 converts AC power input from the AC/DC conversion circuit 400 via the radio frequency transformer 310 into DC power by the diode. That is, the DC/DC conversion circuit 112 operates as the bidirectional power conversion circuit.

In the DC/DC conversion circuit 112 illustrated in FIG. 6, a bidirectional DC/DC conversion circuit of a so-called dual bridge converter (DAB) system is used.

Furthermore, in the DC/DC conversion circuit 112 illustrated in FIG. 6, a so-called solid state transformer (SST) that transforms a voltage by radio frequency switching of a semiconductor switching element and a radio frequency transformer is used. As a result, the power conversion unit 10 including the plurality of converter units 116 can be downsized.

Figure 7:
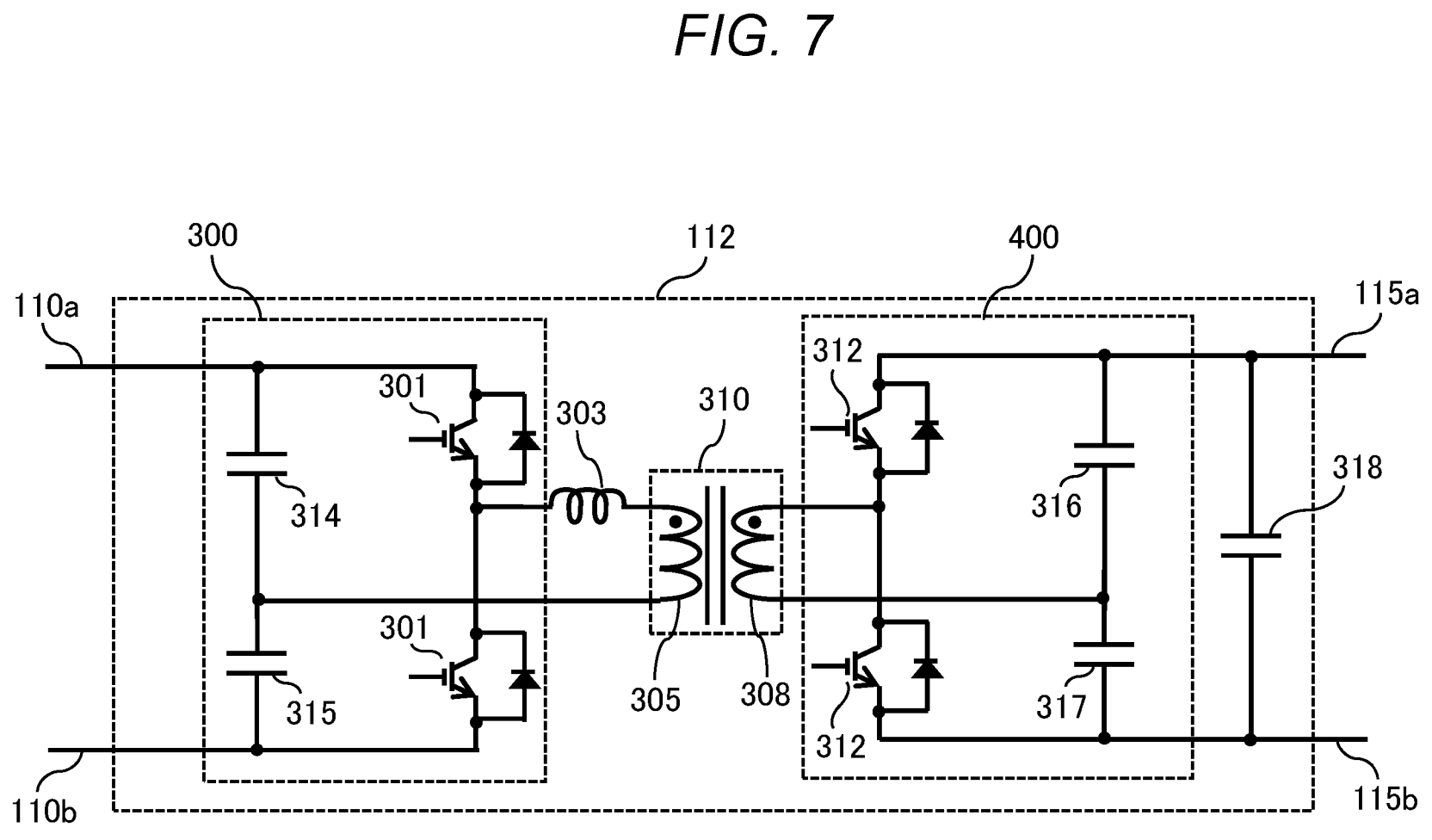

FIG. 7 is a circuit diagram illustrating another example of the DC/DC conversion circuit 112 (FIG. 1).

As illustrated in FIG. 7, the DC/DC conversion circuit 112 is of an isolated type, and includes the DC/AC conversion circuit 300 and the AC/DC conversion circuit 400 connected to the DC/AC conversion circuit 300 via the radio frequency transformer 310.

The DC/AC conversion circuit 300 includes a parallel connection circuit between one half bridge circuit using the semiconductor device 301 in which the semiconductor switching element (In FIG. 7, the IGBT) and the diode are connected in antiparallel to each other, and a series connection circuit of capacitors 314 and 315.

Parallel connection points between the half bridge circuit and the series connection circuit of the capacitors 314 and 315 are connected to the DC buses 110a and 110b, respectively, as DC inputs. A series connection point of the two semiconductor devices 301 in the half bridge circuit and a series connection point of the capacitors 314 and 315 are connected as an AC output to the primary winding 305 of the radio frequency transformer 310 via the reactor 303.

The AC/DC conversion circuit 400 includes a parallel connection circuit between one half bridge circuit using the semiconductor device 312 in which the semiconductor switching element (In FIG. 7, the IGBT) and the diode are connected in antiparallel to each other, and a series connection circuit of capacitors 316 and 317. A capacitor 318 is connected to parallel connection points between the half bridge circuit and the series connection circuit of the capacitors 316 and 317.

A series connection point of the two semiconductor devices 312 in the half bridge circuit and a series connection point of the capacitors 316 and 317 are connected as an AC input to the secondary winding 308 of the radio frequency transformer 310. The capacitor 318 is connected to parallel connection points between the half bridge circuit and the series connection circuit of the capacitors 316 and 317. The parallel connection points are connected to the DC buses 115a and 115b, respectively, as DC outputs.

The DC/AC conversion circuit 300 converts DC power input from the DC buses 110a and 110b into AC power by the semiconductor switching element, and outputs the AC power to the primary winding 305 of the radio frequency transformer 310. The radio frequency transformer 310 steps down or steps up the AC voltage of the AC power received by the primary winding 305, and outputs the AC power to the secondary winding 308.

The AC/DC conversion circuit 400 rectifies the AC power input from the secondary winding 308 by the diode and converts the rectified AC power into DC power. The DC power is charged in the capacitor 318 and is output to the DC buses 115a and 115b.

The AC/DC conversion circuit 400 converts DC power input from the DC buses 115a and 115b into AC power by the semiconductor switching element. The DC/AC conversion circuit 300 converts AC power input from the AC/DC conversion circuit 400 via the radio frequency transformer 310 into DC power by the diode. That is, the DC/DC conversion circuit 112 operates as the bidirectional power conversion circuit.

In the DC/DC conversion circuit 112 illustrated in FIG. 7, the solid state transformer (SST) is used similarly to the DC/DC conversion circuit 112 illustrated in FIG. 6. As a result, the power conversion unit 10 including the plurality of converter units 116 can be downsized.

In a case where the converter cell 108 (FIG. 1) includes the AC/DC conversion circuit 109 illustrated in FIG. 4 and the DC/DC conversion circuit 112 illustrated in FIG. 6, a common DC link capacitor may be used as the capacitor 201

(FIG. 4) and the capacitor 311 (FIG. 6). In addition, in a case where the converter cell 108 (FIG. 1) includes the AC/DC conversion circuit 109 illustrated in FIG. 5 and the DC/DC conversion circuit 112 illustrated in FIG. 7, a common capacitor two-series connection circuit may be used as the series connection circuit of the capacitors 202 and 203 (FIG. 5) and the series connection circuit of the capacitors 314 and 315 (FIG. 7).

As described above, in the present embodiment, the isolated DC/DC conversion circuit 112 is applied, and thus the AC input and the DC output of the converter unit 116 are electrically isolated from each other.

As a circuit configuration of the bidirectional DC/DC converter 160 connected between two different DC outputs of the power conversion unit 10, the isolated bidirectional DC/DC conversion circuits illustrated in FIGS. 6 and 7 are used. In the present embodiment, the output voltages are equal to each other, and thus a transformation ratio of the radio frequency transformer 310 is 1:1. The DC outputs are electrically isolated from each other by the radio frequency transformer 310, and thus electrical isolation between the EVs each connected to the EV charging port 122 can be secured. In addition, the power can be bidirectionally transmitted between two different DC outputs, and thus the power conversion unit 10 according to the present embodiment can simultaneously supply a plurality of pieces of different required power.

Figure 8:
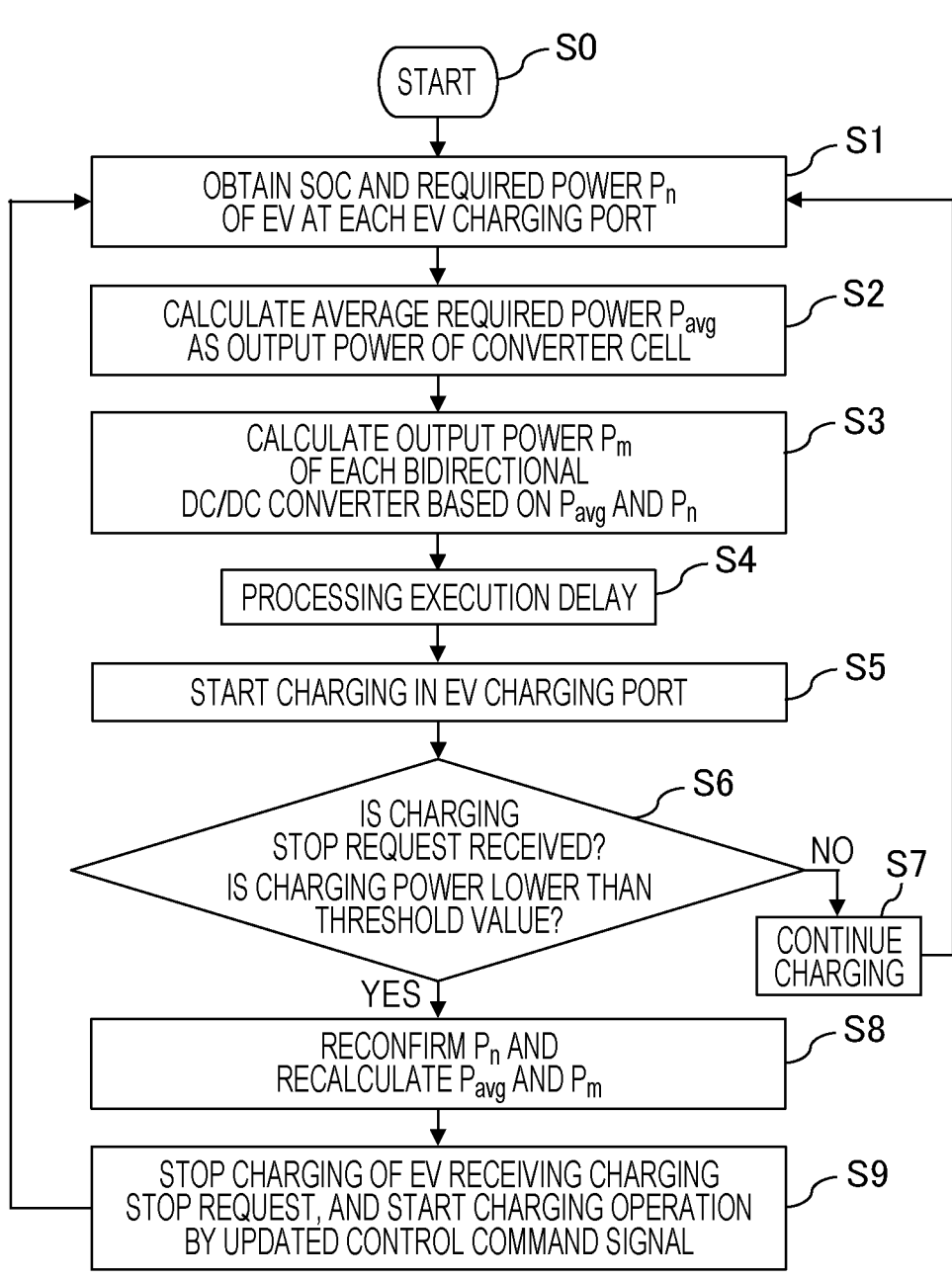
FIG. 8 is a flowchart illustrating a charge control operation of the control unit 128 (FIG. 1)

FIG. 8 is a flowchart illustrating a charge control operation of the control unit 128 (FIG. 1). Note that the control unit 128 includes a computer system such as a microcomputer, and performs a control operation by the computer system executing a predetermined program.

In step S0, the control unit 128 starts the charge control operation.

Next, in step S1, the control unit 128 obtains the SOC and the required power ($P_n$ (n is a natural number: $1 \leq n \leq N$)) of the EV at each of the plurality (N) of EV charging ports 122 (charging stations) based on the EV side information 133. Note that in a case where the EV side information 133 includes the charging speed, the control unit 128 obtains the required power based on correspondence data between the charging speed and the required power provided in advance.

Next, in step S2, the control unit 128 calculates average required power $P_{avg}$ ($= (\Sigma P_n)/N$) as the output power of each DC output of the power conversion unit 10, that is, the output power of each of the N converter units 116 based on the required power ($P_n$) obtained in step S1.

Next, in step S3, the control unit 128 calculates the transmission power, that is, output power $P_m$ ($1 \leq m \leq N-1$) of the bidirectional DC/DC converters 160-1 to 160-(N-1) connected between the DC outputs of the power conversion device 127 based on the average required power $P_{avg}$ calculated in step S2 and the required power $P_n$ obtained in step S1.

After executing step S3, the control unit 128 executes step S5 after a predetermined delay time (step S4). In the present embodiment, the delay time is 1 msec or less.

Note that during the delay time, the control unit 128 creates and sets the control command signal 130 (FIG. 1) to each converter unit 116 and the bidirectional DC/DC converters 160-1 to 160-N according to the SOC, the $P_{avg}$, and the $P_m$. Such control command signal creation may be executed in the charge control operation illustrated in FIG. 8. In that case, step S4 is replaced with the control command signal creation operation.

In step S5, the control unit 128 causes the converter unit 116 and the bidirectional DC/DC converters 160-1 to 160-N to output DC power according to the control command signal, and thus starting charging in the EV charging ports 122.

Next, in step S6, the control unit 128 determines whether a request signal for stopping the charging has been received, and whether the charging power of the EV is lower than a predetermined threshold value. If the control unit 128 determines that the request signal has been received or the charging power is lower than the threshold (YES in step S6), then the control unit 128 executes step S8. If the control unit 128 determines that the request signal has not been received and the charging power is not lower than the threshold (NO in step S6), then the control unit 128 executes step S7. In this case, the control unit 128 continues charging and further executes step S1 and subsequent steps again.

In the present embodiment, the threshold value of the charging power is 1 kW or less.

In step S8, the control unit 128 reconfirms the SOC and the required power $P_n$ of each EV similarly to step S1, recalculates the average required power $P_{avg}$ as the output power of each converter unit 116 similarly to step S2, and recalculates the output power $P_m$ of the bidirectional DC/DC converters 160-1 to 160-(N-1) similarly to step S3.

Next, in step S9, the control unit 128 stops the charging of the EV that has received the charging stop request, and starts the charging operation by the control command signal 130 updated based on $P_{avg}$ and $P_m$ recalculated in step S8. When executing step S9, the control unit 128 executes step S1 and the subsequent steps again.

Hereinafter, various operation modes of the power conversion device 127 (FIG. 1) for the EV charging in the present embodiment will be described with reference to FIGS. 9 to 13. In each drawing, the number of outputs of the power conversion unit 10 is "3" as in FIG. 2 described above. In each drawing, the flow of power is indicated by an arrow.

Figure 9:
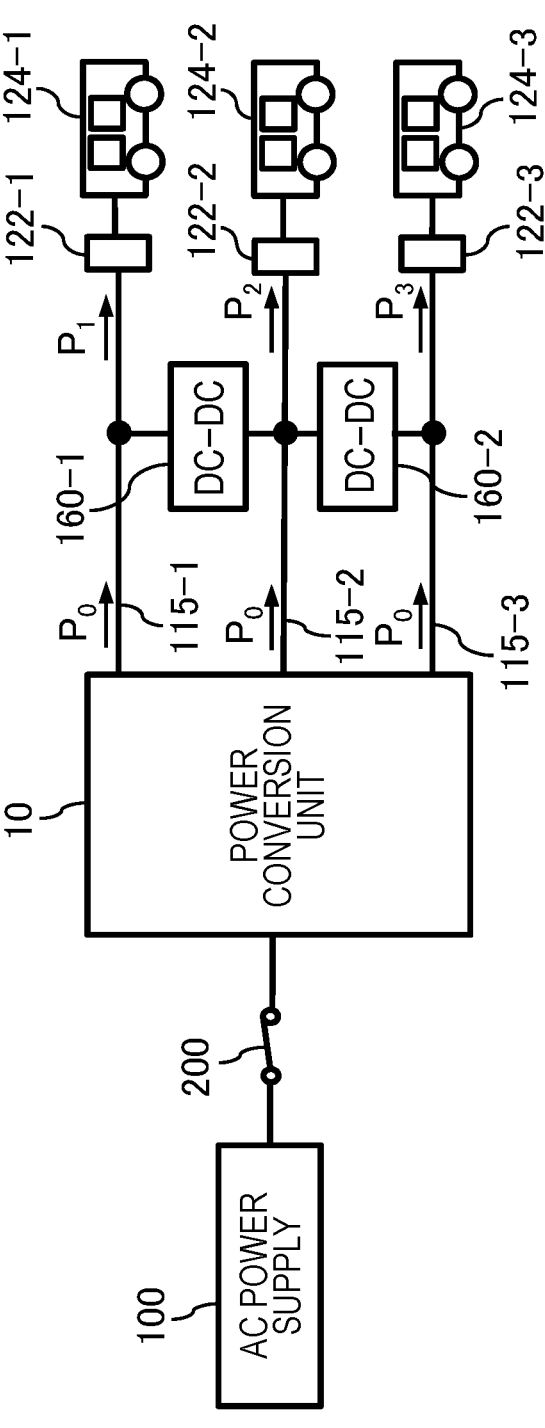
FIG. 9 is a schematic functional block diagram illustrating a flow of power in a first operation mode of the power conversion device 127.

FIG. 9 is a schematic functional block diagram illustrating a flow of power in a first operation mode of the power conversion device 127.

In the present operation mode, pieces of the required power of the EVs 124-1, 124-2, and 124-3 are equal to each other ($P_1 = P_2 = P_3$), and only pieces of the output power ($P_O$) of the DC outputs 115-1, 115-2, and 115-3 of the power conversion unit 10 are charged in the storage devices of the EVs 124-1, 124-2, and 124-3, respectively. Therefore, the transmission power ($P_{12}$ and $P_{23}$) by the bidirectional DC/DC converters 160-1 and 160-2 is zero.

Figure 10:
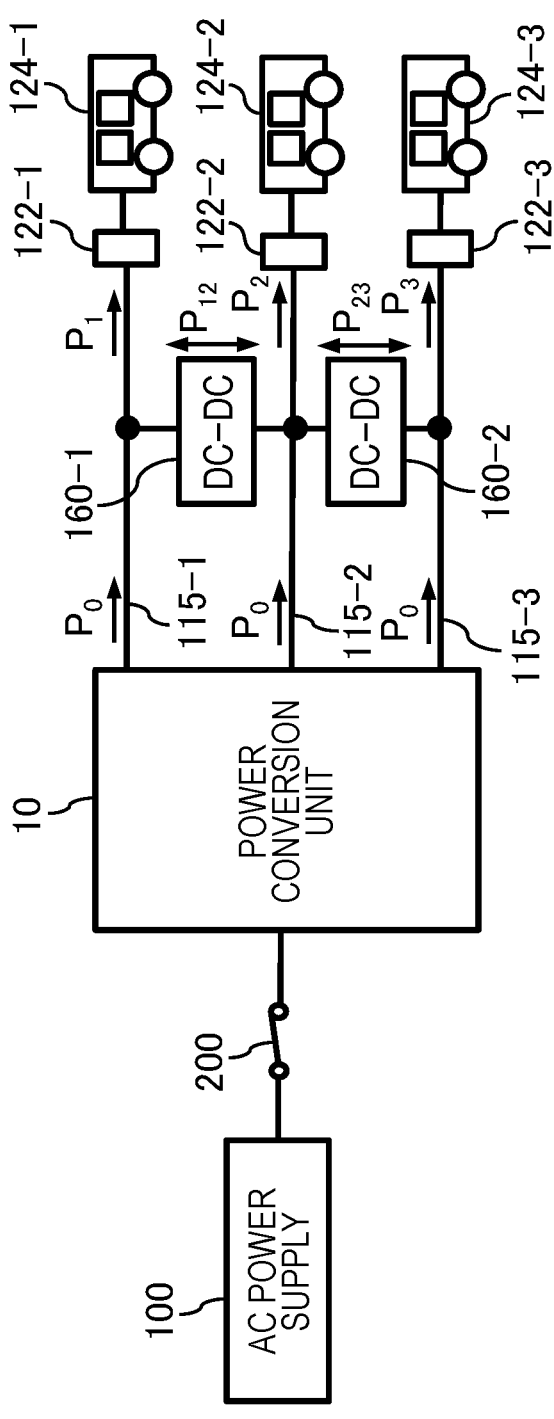
FIG. 10 is a schematic functional block diagram illustrating a flow of power in a second operation mode of the power conversion device 127.

FIG. 10 is a schematic functional block diagram illustrating a flow of power in a second operation mode of the power conversion device 127.

In the present operation mode, pieces of the required power of the EVs 124-1, 124-2, and 124-3 are not equal to each other. Therefore, pieces of the power ($P_{12}$ and $P_{23}$) are transmitted between the two outputs of the power conversion unit 10 by the bidirectional DC/DC converters 160-1 and 160-2, respectively.

Each of the bidirectional DC/DC converters 160-1 and 160-2 connected between the two DC outputs of the power conversion unit 10 transmits power from one DC output to the other DC output or in the opposite direction according to the required power. In addition, power is transmitted between two outputs (In FIG. 10, between DC outputs 115-1 and 115-3) of the power conversion unit 10 via a plurality of bidirectional DC/DC converters (In FIG. 10, 2 converters (160-1 and 160-2)) according to the required power.

According to such a second operation mode, the plurality of storage devices of the plurality of electric vehicles can be charged at different charging speeds.

Figure 11:
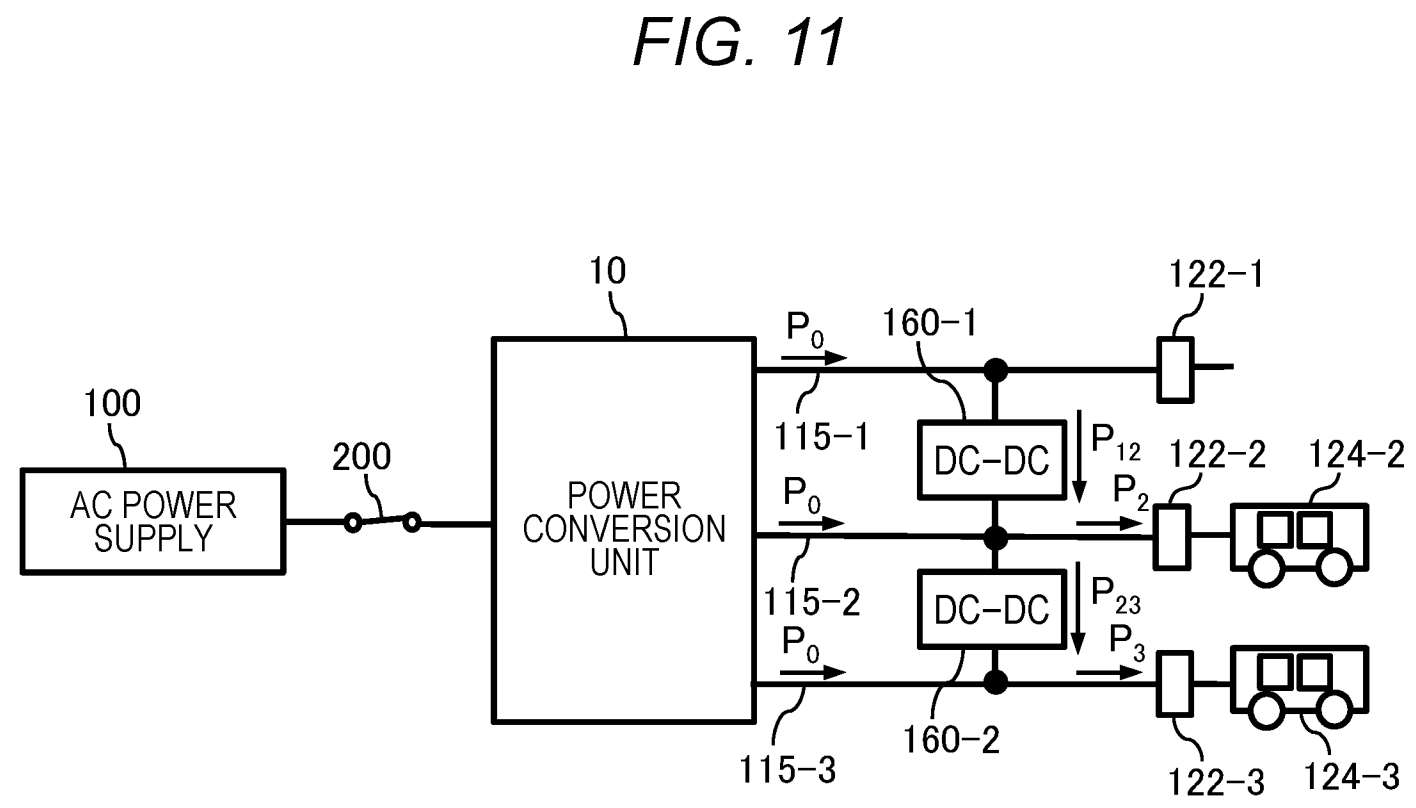

FIG. 11 is a schematic functional block diagram illustrating a flow of power in a third operation mode of the power conversion device 127.

In the present operation mode, the EV 124-1 is not connected to the EV charging port 122-1. Therefore, the required power $P_1$ is zero. Therefore, the total power ($P_0$) output from the DC output 115-1 is transmitted from the DC output 115-1 to the DC output 115-2 by the bidirectional DC/DC converter 160-1 connected to the DC output 115-1.

Figure 12:
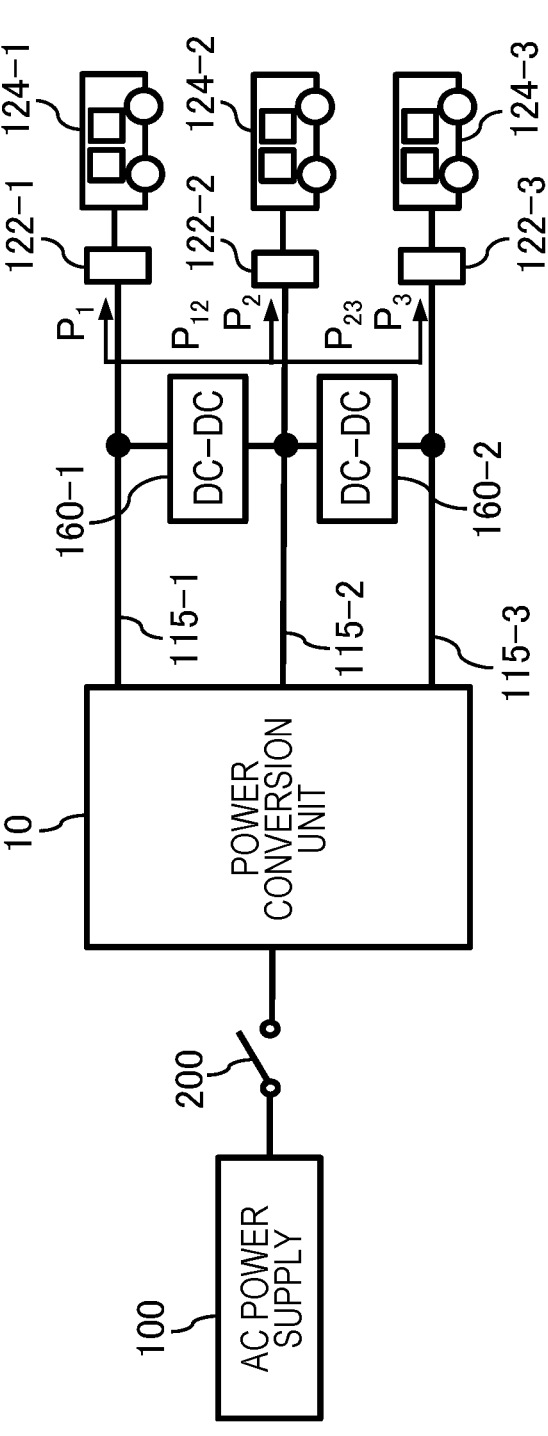
FIG. 12 is a schematic functional block diagram illustrating a flow of power in a fourth operation mode of the power conversion device 127.

FIG. 12 is a schematic functional block diagram illustrating a flow of power in a fourth operation mode of the power conversion device 127.

In the present operation mode, power is exchanged only between the storage devices of the EVs 124-1, 124-2, and 124-3. The power discharged from any of the storage devices of the EVs 124-1, 124-2, and 124-3 is charged in the storage device of any other EV by the bidirectional DC/DC converters 160-1 and 160-2.

Note that the power switch 200 is turned off, and the power conversion unit 10 is in an operation stop state. Thus, the output power of the plurality of DC outputs 115-1, 115-2, and 115-3 of the power conversion unit 10 is zero ($P_0$=0).

As described above, according to the fourth operation mode, the plurality of storage devices of the plurality of electric vehicles can charge and discharge each other by the bidirectional converters.

Figure 13:
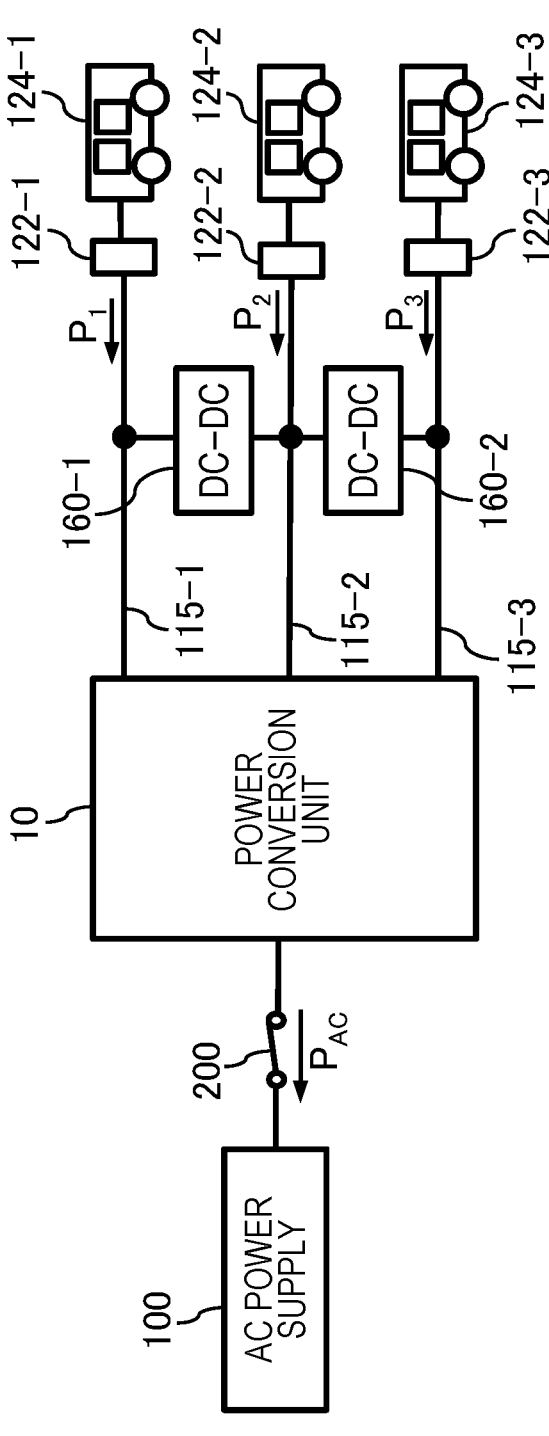
FIG. 13 is a schematic functional block diagram illustrating a flow of power in a fifth operation mode of the power conversion device 127.

FIG. 13 is a schematic functional block diagram illustrating a flow of power in a fifth operation mode of the power conversion device 127.

In the present operation mode, DC power ($P_1$, $P_2$, and $P_3$) discharged from the storage devices of the EVs 124-1, 124-2, and 124-3, respectively, is converted into AC power $P_{AC}$ by the plurality of converter units 116 (FIG. 1) included in the power conversion unit 10, and is output to the AC power supply 100, that is, the AC power system side. Note that the transmission power by the bidirectional DC/DC converters 160-1 and 160-2 is zero ($P_{12}$=$P_{23}$=0).

As described above, according to the fifth operation mode, the power of the plurality of storage devices of the plurality of electric vehicles is supplied to the AC power supply side via the power conversion unit 10, that is, via the plurality of converter units 116 (FIG. 1).

Note that the present invention is not limited to the above-described embodiment, and includes various modifications. For example, the above-described embodiments have been described in detail for easy understanding of the present invention, and are not necessarily limited to those having all the described configurations. In addition, it is possible to add, delete, and replace other configurations for a part of the configuration of each embodiment.

The storage device mounted on the EV may be a capacitor in addition to the storage battery. In addition, the charging target is not limited to the storage device mounted on the EV, and may be a storage device mounted on another device, or may be a storage device alone.

A converter module may be used as each of the bidirectional DC/DC converters 160-1 to 160-(N−1).

The semiconductor switching element constituting the AC/DC conversion circuit 109, the DC/DC conversion circuit 112, and the bidirectional DC/DC converters 160-1 to 160-(N−1) is not limited to the IGBT, and may be a MOSFET, a junction bipolar transistor, or the like. In addition, a semiconductor material constituting the semiconductor switching element or the diode is not limited to Si, and may be a wide-gap semiconductor such as SiC or GaN.

What is claimed is:

1. A power conversion device configured to charge a plurality of storage devices, the power conversion device comprising:
    a plurality of converter units each configured to receive AC power and output DC power; and
    a bidirectional DC/DC converter connected between two DC outputs of a plurality of DC outputs of the plurality of converter units, wherein
    the bidirectional DC/DC converter transmits at least a part of output power of the converter unit at one DC output from the one DC output to another DC output of the two DC outputs according to required power of the plurality of storage devices, and
    the power conversion device includes N (N≥3) converter units, and only N−1 bidirectional DC/DC converters.

2. The power conversion device according to claim 1, wherein the output power from each of the plurality of DC outputs is equal.

3. The power conversion device according to claim 2, wherein a value of the output power is an average value of the required power of the plurality of storage devices.

4. The power conversion device according to claim 3, wherein a value of the required power of the storage device connected to the other DC output is larger than the average value.

5. The power conversion device according to claim 2, wherein a rated power capacity of the bidirectional DC/DC converter is 50% or more of a rated power capacity of the converter unit and is smaller than the rated power capacity of the converter unit.

6. The power conversion device according to claim 1, wherein the bidirectional DC/DC converter is of an isolated type.

7. The power conversion device according to claim 1, wherein the part of the output power is transmitted by a plurality of the bidirectional DC/DC converters of the N−1 bidirectional DC/DC converters.

8. The power conversion device according to claim 1, wherein
    AC inputs of the plurality of converter units are connected in series to each other, and
    the AC input and the DC output of each of the plurality of converter units is electrically isolated from each other.

9. The power conversion device according to claim 1, wherein the plurality of storage devices are charged at different charging speeds.

10. The power conversion device according to claim 1, wherein the plurality of storage devices are charged and discharged with each other by the bidirectional DC/DC converter.

11. The power conversion device according to claim 1, wherein DC power of the plurality of storage devices is further supplied to a power supply side configured to supply the AC power via the plurality of converter units.

12. A method of controlling a power conversion device configured to charge a plurality of storage devices, the power conversion device comprising:
    a plurality of converter units that each receive AC power and output DC power; and
    a bidirectional DC/DC converter connected between two DC outputs of a plurality of DC outputs of the plurality of converter units, the method comprising:
    calculating an average value of required power of the plurality of storage devices; and controlling output power of the bidirectional DC/DC converter based on the required power and the average value, wherein the power conversion device includes N (N≥3) converter units, and N−1 bidirectional DC/DC converters.

* * * * *